Patented May 9, 1939

2,157,854

UNITED STATES PATENT OFFICE 2,157,854

COMPOSITION OF MATTER USEFUL FOR MOTHPROOFING

David W. Jayne, Jr., Elizabeth, N. J., assignor to American Cyanamid Company, New York, N. Y., a corporation of Maine No Drawing. Application December 2, 1936, Serial No. 113,825

11 Claims. (Cl. 167—37)

The present invention relates to a composition of matter useful in protecting wool and other fibrous materials against attack by moths.

In Patent 1,915,922 to Christmann and Jayne, there is disclosed a composition of matter for this purpose which includes a fatty acid salt of a guanidine dissolved in petroleum naphtha.

Commercial exploitation of the Christmann and Jayne invention has confirmed the effectiveness of the fatty acid salt of the guanidines as mothproofing agents. Some difficulty has been experienced, however, in that in exceptionally low temperatures, that is, at substantially 0° C., a white precipitate forms, which settles out in storage. The solution first becomes cloudy and in time this precipitate settles out as a slimy, mobile layer, which is difficult to put back into solution except by warming to considerably above ordinary temperatures with stirring.

There is also on the market, a mothproofing solution which includes the para tertiary amyl phenol salt of a guanidine dissolved in petroleum naphtha and this material is also very effective for that purpose. It has likewise been found, however, that at low temperatures this guanidine salt has a tendency to separate out of the solution.

Experience with the above guanidine salts and other salts has indicated that this is a characteristic of solutions thereof.

The principal object of the invention, therefore, is the provision in a solution of a guanidine salt of a material which will increase the solubility of the salt in the solvent particularly to an extent which will prevent the formation of a precipitate at low temperatures.

It has been discovered that the above object may be accomplished by using comparatively small quantities of secondary butyl alcohol or the alkyl ethers of a glycol. The ethyl or butyl ethers of ethylene glycols have been found to be particularly effective for this purpose.

As an example, a mothproofing solution made up from 94% petroleum naphtha, 3% dixylyl guanidine and 3% cocoanut oil fatty acids became cloudy when lowered to a temperature of —6° C. When a similar mixture containing 2% of the butyl ether of ethylene glycol to replace 2% of the petroleum naphtha was made, it remained perfectly clear after two hours at a temperature of —15.5° C.

The same effects were obtained when using the ethyl ether of ethylene glycol and secondary butyl alcohol.

Similar experiments were conducted with the para tertiary amyl phenol salt of a guanidine. This composition became distinctly clouded at —8° C. but in the presence of 4% of an alkyl ether of ethylene glycol the solution remained perfectly clear at —15° C.

The presence of these materials to increase the solubility of the guanidine salt in the solvent has not been found to detract from the toxicity of the active ingredient to moths or to in any way damage the fabric to which the solution is applied.

In practice, the guanidine salts dissolved in a suitable solvent are made as concentrated solutions which are then diluted to the required guanidine content prior to use. Consequently, if this practice is to be followed, a sufficient quantity of the material aimed to increase the solubility of the guanidine salt in the solvent is added initially to the concentrate so that when this concentrate is ultimately diluted, an effective amount of the material to increase the solubility of the guanidine salt is present.

It has also been found that while it is desirable to make up the concentrate using petroleum naphtha, yet once the guanidine salt is in solution and particularly under circumstances where a material has been added which increases the solubility of the guanidine salt in the solvent, that the concentrate may be diluted with materials other than petroleum naphtha. For instance, one part by weight of the naphtha concentrate may be diluted with three parts by weight of carbon tetrachloride without in any way detrimentally affecting either the solution's ability to remain clear at low temperatures, or the toxic effect of the active ingredient. The use of carbon tetrachloride in this manner is of particular value in that the fire hazard normally existent with the use of naphtha alone is materially decreased.

While the invention has been shown and described with particular reference to specific embodiments, it is to be understood that it is not to be limited thereto, but is to be restricted only by the scope of the appended claims.

I claim:

1. A composition of matter useful for mothproofing comprising a solution of a guanidine salt in an organic solvent and a substance which has the effect of increasing the solubility of said salt in said solvent in which the substance is chosen from the group consisting of secondary butyl alcohol and an alkyl ether of ethylene glycol.

2. A composition of matter useful for mothproofing comprising a solution of a guanidine salt in an organic solvent and a substance which has the effect of increasing the solubility of said salt in said solvent in which the substance is an alkyl ether of ethylene glycol.

3. A composition of matter useful for mothproofing comprising a solution of a guanidine salt in an organic solvent and a substance which has the effect of increasing the solubility of said salt in said solvent in which the substance is ethyl ether of ethylene glycol.

4. A composition of matter useful for mothproofing comprising a solution of a guanidine salt in an organic solvent and a substance which has the effect of increasing the solubility of said salt in said solvent in which the substance is butyl ether of ethylene glycol.

5. A composition of matter useful for mothproofing comprising a solution of a guanidine salt in an organic solvent and a substance which has the effect of increasing the solubility of said salt in said solvent in which the substance is mono ethyl ether of ethylene glycol.

6. A composition of matter useful for mothproofing comprising a solution of a guanidine salt in an organic solvent and a substance which has the effect of increasing the solubility of said salt in said solvent in which the substance is mono butyl ether of ethylene glycol.

7. A composition of matter useful for mothproofing comprising a solution of a fatty acid salt of a guanidine dissolved in petroleum naphtha, and a sufficient quantity of mono butyl ether of ethylene glycol to increase the solubility of the guanidine salt in the solvent.

8. A composition of matter useful for mothproofing comprising a solution of a para tertiary amyl phenol salt of a guanidine dissolved in petroleum naphtha, and a sufficient quantity of mono butyl ether of ethylene glycol to increase the solubility of the guanidine salt in the solvent.

9. A composition of matter useful for mothproofing comprising a solution of a fatty acid salt of dixylyl guanidine dissolved in petroleum naphtha, and a sufficient quantity of mono butyl ether of ethyleneglycol to increase the solubility of the guanidine salt in the solvent.

10. A composition of matter useful for mothproofing comprising a solution of a para tertiary amyl phenol salt of dixylyl guanidine dissolved in petroleum naphtha, and a sufficient quantity of mono butyl ether of ethylene glycol to increase the solubility of the guanidine salt in the solvent.

11. A composition of matter useful for mothproofing comprising a solution of a salt of xylyl guanidine in an organic solvent and a sufficient quantity of a substance chosen from the group consisting of secondary butyl alcohol and an alkyl ether of ethylene glycol to increase the solubility of the salt of xylyl guanidine in the solvent.

DAVID W. JAYNE, JR.